US007779129B2

(12) United States Patent
Hall et al.

(10) Patent No.: US 7,779,129 B2
(45) Date of Patent: Aug. 17, 2010

(54) METHOD AND SYSTEM FOR IMPROVING THE AVAILABILITY OF SOFTWARE PROCESSES UTILIZING CONFIGURABLE FINITE STATE TABLES

(75) Inventors: Adrian R. Hall, Warwickshire (GB); Craig W. Fellenstein, Brookfield, CT (US); Jean-Marc Berthaud, Villeneuve-Loubet (FR)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 11/845,545

(22) Filed: Aug. 27, 2007

(65) Prior Publication Data
US 2007/0294573 A1  Dec. 20, 2007

Related U.S. Application Data

(62) Division of application No. 10/216,104, filed on Aug. 8, 2002, now abandoned.

(51) Int. Cl.
*G06F 15/16* (2006.01)
(52) U.S. Cl. .................. 709/226; 709/203; 709/229; 709/230
(58) Field of Classification Search .......... 709/203, 709/226, 229, 230
See application file for complete search history.

(56) References Cited

U.S. PATENT DOCUMENTS

| 4,860,196 | A | 8/1989 | Wengert |
| 4,975,831 | A | 12/1990 | Nilsson et al. |
| 5,063,523 | A | 11/1991 | Vrenjak |
| 5,278,390 | A | 1/1994 | Blankenship |
| 5,544,077 | A | 8/1996 | Hershey |
| 5,644,720 | A | 7/1997 | Boll et al. |
| 5,828,847 | A | 10/1998 | Gehr et al. |
| 6,134,673 | A | 10/2000 | Chrabaszcz |
| 6,594,786 | B1* | 7/2003 | Connelly et al. ............ 709/224 |
| 6,732,186 | B1* | 5/2004 | Hebert ...................... 709/239 |
| 6,772,226 | B1* | 8/2004 | Bommareddy et al. ...... 709/245 |
| 6,823,382 | B2* | 11/2004 | Stone ......................... 709/224 |
| 6,948,088 | B1 | 9/2005 | Sharan |
| 6,963,995 | B2* | 11/2005 | Fee .............................. 714/4 |
| 7,035,858 | B2* | 4/2006 | Dinker et al. ............... 709/220 |
| 7,299,294 | B1* | 11/2007 | Bruck et al. ................ 709/235 |
| 7,404,000 | B2* | 7/2008 | Lolayekar et al. ........... 709/230 |

(Continued)

OTHER PUBLICATIONS

Wu, Q.Y.; Non-Final Office Action; Date: Jul. 26, 2005; U.S. Appl. No. 10/216,104; USPTO.

(Continued)

*Primary Examiner*—Phuoc Nguyen
(74) *Attorney, Agent, or Firm*—William H. Steinberg; Robert C. Rolnik; Cardinal Law Group

(57) ABSTRACT

The invention provides a system and method for providing a high availability application at low cost for a wide range of solution architectures. A user runs a simplistic web-based wizard to install the high availability application. Then, a user designs the high availability application's logic for an individual process or process-group using a finite state table. Next, a standard UNIX init process spawner subsystem is extended to implement the high availability application as a property of a process. Finally, the logic from the finite state table is used to make each process or process-group highly available.

12 Claims, 3 Drawing Sheets

U.S. PATENT DOCUMENTS

| | | | |
|---|---|---|---|
| 2001/0047400 A1 | 11/2001 | Coates et al. | |
| 2002/0095524 A1 | 7/2002 | Sanghvi et al. | |
| 2002/0103846 A1* | 8/2002 | Zisapel et al. | 709/105 |
| 2002/0129146 A1* | 9/2002 | Aronoff et al. | 709/225 |
| 2002/0143888 A1* | 10/2002 | Lisiecki et al. | 709/214 |
| 2003/0079019 A1* | 4/2003 | Lolayekar et al. | 709/226 |
| 2003/0126473 A1 | 7/2003 | Maciorowski et al. | |

OTHER PUBLICATIONS

Wu, Q.Y.; Non-Final Office Action; Date: Jan. 18, 2006; U.S. Appl. No. 10/216,104; USPTO.

Wu, Q.Y.; Non-Final Office Action; Date: Jun. 5, 2006; U.S. Appl. No. 10/216,104; USPTO.

Wu, Q.Y.; Final Office Action; Date: Jun. 4, 2007; U.S. Appl. No. 10/216,104; USPTO.

Linux Virtual Server Project; Linux Server Cluster for Load Balancing; Date: Oct. 3, 2001; http://www.linuxvirtualserver.org.

Horman; Fake; Date: Oct. 3, 2001; http://www.vergenet.net/linux/fake.

Pawul, R.; Getting Started with Linux-HA (heartbeat); Date: Oct. 6, 2001; http://linux-ha.org.

Trocki,J.; mon-Service Monitoring Daemon; Date: Oct. 11, 2001; http://mon.wiki.kernel.org/index.php/Main_Page.

Muller, A.; Availability Through Failover; Date: Oct. 11, 2001; http://failover.othello.ch.

Pistoia, M.; IBM WebSphere Performance Pack: Load Balancing with IBM SecureWay Network Dispatcher; Date: Oct. 1999; pp. 1-438; IBM Redbook SG24-5858-00.

IBM; High Availability on the RISC System/6000 Family: Date: Oct. 1995; pp. 1-266; IBM Redbook SG24455100.

* cited by examiner

| THIS | | | OTHER | | | | | | | | Unknown |
|---|---|---|---|---|---|---|---|---|---|---|---|
| | | | Primary | | | | Secondary | | | | |
| | | | Ping-Ref (PR) | | !PR | | Ping-Ref (PR) | | !PR | | |
| | | | H | !H | H | !H | H | !H | H | !H | |
| Primary | Ping-Ref (PR) | H | ?ip< | P | P | P | P | P | P | P | P |
| | | !H | S | ?ip< | S | P | DY | P | DY | P | P |
| | !PR | H | S | P | ?ip< | P | DY | P | P | P | SPICE |
| | | !H | S | S | S | ?ip< | 33 DY | DY | DY | P | SPICE |
| Secondary | Ping-Ref (PR) | H | 34 S | DT | !DT | DT | ?ip> | P | P | P | P |
| | | !H | S | S | S | DT | S | ?ip> | S | P | S |
| | !PR | H | S | DT | S | DT | S | P | ?ip> | P | S |
| | | !H | S | S | S | S | S | S | S | ?ip> | S |

FIG. 3

METHOD AND SYSTEM FOR IMPROVING THE AVAILABILITY OF SOFTWARE PROCESSES UTILIZING CONFIGURABLE FINITE STATE TABLES

RELATED APPLICATIONS

This application is a divisional application of, and claims the benefit of, and priority to, U.S. patent application Ser. No. 10/216,104, filed Aug. 8, 2002, now abandoned the entirety of which is incorporated herein by reference.

FIELD OF THE INVENTION

The invention relates, generally, to a technique for creating high-availability system solutions utilizing user criteria wherein said criteria includes pluggable finite state tables, fail safe monitoring processes and checking routines for said finite state tables.

BACKGROUND OF THE INVENTION

Commercial High Availability (HA) solutions conventionally provide an umbrella framework in which processes and other resources are controlled, and made highly available, across a range of systems that reside under the control of the umbrella (cluster).

Low-cost HA software packages generally do not meet the operating requirements or provide the flexibility required for many different solution architectures; making them unsuitable for all but a limited number of qualified situations. These limited situations include those where conditions and requirements match assumptions built into the software (including concurrency vs. outage, pre-emptive vs. wait'n'see, and fast-failover vs. resource depletion trade-off decisions).

High function HA software packages, by contrast, are typically able to meet stringent operating requirements. However, they usually are only available for a single vendor's platforms, mandate highly structured and complex clustered architectures, require redundant hardware adapters, and have purchase and maintenance costs that are inappropriate for many solutions.

Therefore, there is a need to provide an HA software solution that overcomes the aforementioned disadvantages.

SUMMARY OF THE INVENTION

One aspect of the present invention is a method of providing a high availability application at low cost for a wide range of solution architectures. A user runs a simplistic web-based wizard to install the high availability application. Then, a user designs the high availability application's logic for an individual process or process-group using a finite state table. Next, an extension to the standard UNIX init process spawner subsystem is used to implement the high availability application as a property of a process. Finally, the logic from the finite state table is used to make each process or process-group highly available.

Another aspect of the present invention is a system for providing a high availability application at low cost for a wide range of solution architectures, comprising means for running a simplistic web-based wizard to install the high availability application and means for designing the high availability application logic for an individual process or process-group using a finite state table. The system also includes means for extending the standard UNIX init process spawner subsystem to implement the high availability application as a property of a process and means for using the logic from the finite state table to make each process or process-group highly available.

Another aspect of the present invention is a computer usable medium storing a program for providing a high availability application at low cost for a wide range of solution architectures, comprising computer readable code for running a simplistic web-based wizard to install the high availability application and means for designing the high availability application logic for an individual process or process-group using a finite state table. The medium also includes computer readable code for extending a standard UNIX init process spawner subsystem to implement the high availability application as a property of a process and computer readable code for using the logic from the finite state table to make each process or process-group highly available.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 3 is a chart representation of one embodiment of a design for a finite state table for the system of FIG. 1, in accordance with the present invention.

DETAILED DESCRIPTION OF THE PRESENTLY PREFERRED EMBODIMENTS

Figure 1:
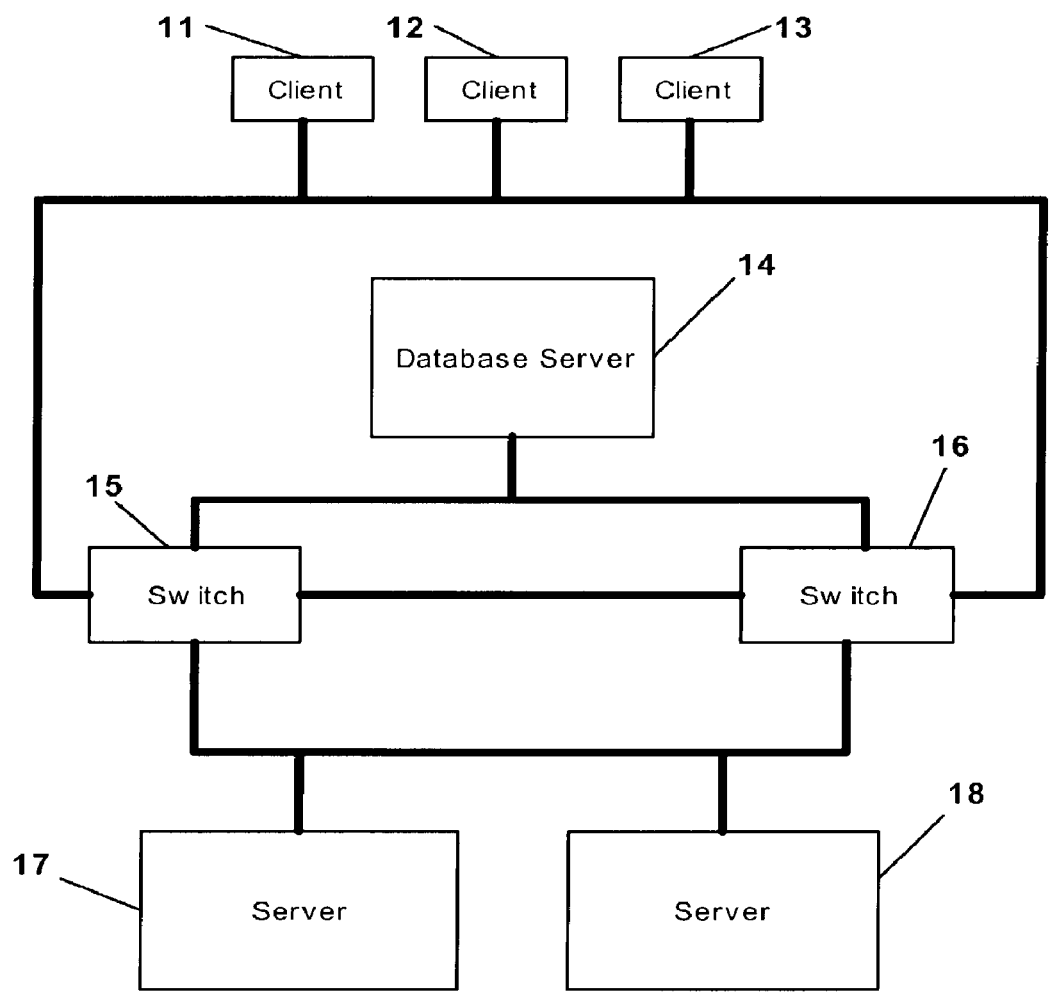
FIG. 1 is a diagram illustrating one embodiment of a system for providing a high availability application at low cost for a wide range of solution architectures in accordance with the present invention.

In FIG. 1, a system 10 is illustrated in accordance with one embodiment of the present invention. In one embodiment, system 10 may be implemented as a system running HA-lite (HAL). HAL is one embodiment of a high availability software that overcomes the aforementioned disadvantages of other high availability software applications. High availability software applications provide a framework in which processes and other resources are controlled, and made highly available.

FIG. 1 represents a typical, client-server architecture that HAL may be capable of supporting. System 10 is a network-based system. The network-based system may provide communication links between various devices and computers connected together within this environment. The network-based system may include permanent connections, such as wire or fiber optic cables, or temporary connections made through telephone or wireless communications.

In this embodiment, the network-based system may contain clients 11, 12, and 13. The clients may be personal or user computers and may be operated by end-users performing daily tasks. Clients 11, 12, and 13 may access a database server 14 via switches 15 and 16. Clients 11, 12, and 13 may also access servers 17 and 18 via switches 15 and 16. One of ordinary skill in the art will recognize that any system 10 may include any number and combination of clients, switches, and servers.

In system 10, switches 15 and 16 are devices that filter and forward packets between network segments. Switches operate at the data link layer and sometimes the network layer and therefore support any packet protocol. Switches 15 and 16 may be used by clients 11, 12, and 13 to access database server 14. Database server 14 may be running UNIX operating system or any of its variants and is a data repository for information used by servers and clients within the network. Switches 15 and 16 may also be used by clients 11, 12, and 13 to access servers 17 and 18. Servers 17 and 18 may be running UNIX operating system or any of its variants and may also be running one or more processes to be used by clients 11, 12, and 13. These processes may be applications or running programs.

HAL may be installed on servers 17 and 18 to control availability of the applications running on each server. Twinituner, a simplistic web-based wizard, may be used to install HAL on servers 17 and 18. Twinituner may be accessed via a CD or from a network server. Twinituner may be run once to install HAL and then whenever necessary to reconfigure HAL. By running twinituner, the user will be able to edit the finite state table. The finite state table is a pluggable logic model that directs system roles. The user can also dry run or simulate the new configurations and continue to make changes until HAL operates as required. Twinituner also allows the user to evaluate his/her configuration changes within the finite state table prior to deployment. Twinituner may also be used to monitor deployed twinit processes (see below) and their associated HAL operations. Twinituner is able to accommodate any suitable hardware or software configuration, or combination thereof.

Once HAL is installed and configured on servers 17 and 18, HAL can be associated with a process or process-group, using HA property extensions to the standard UNIX init process spawner subsystem running on those servers. In one embodiment, twinit is used to implement such process specific, HA property extensions, so forming the association between the process and HAL. After being installed, configured, and then associated with a process or process-group, HAL can be utilized to control the process or process-groups' availability in response to the failure of the system and/or the process or process-group.

The HAL application includes a finite state table for each process. The finite state table allows the user to design the HAL logic for each individual process. One example of configurations to the finite state table is shown in FIG. 3. This configuration utilizes HAL to minimize system outages. This configuration is suitable when it is not a problem to have more than one active primary application, but outages are to be reduced to a minimum. Another configuration includes utilizing HAL to ensure that there is never more than one active application. This configuration is suitable when it is a problem to have more than one active primary application, but it is less of a problem to have windows of time with no active primary applications. Yet another configuration would be suitable when it is not a problem to have more than one active primary application, but it is not necessary to reduce outages to a minimum. The configurations made to the finite state table are stored on each server running HAL.

Figure 2:
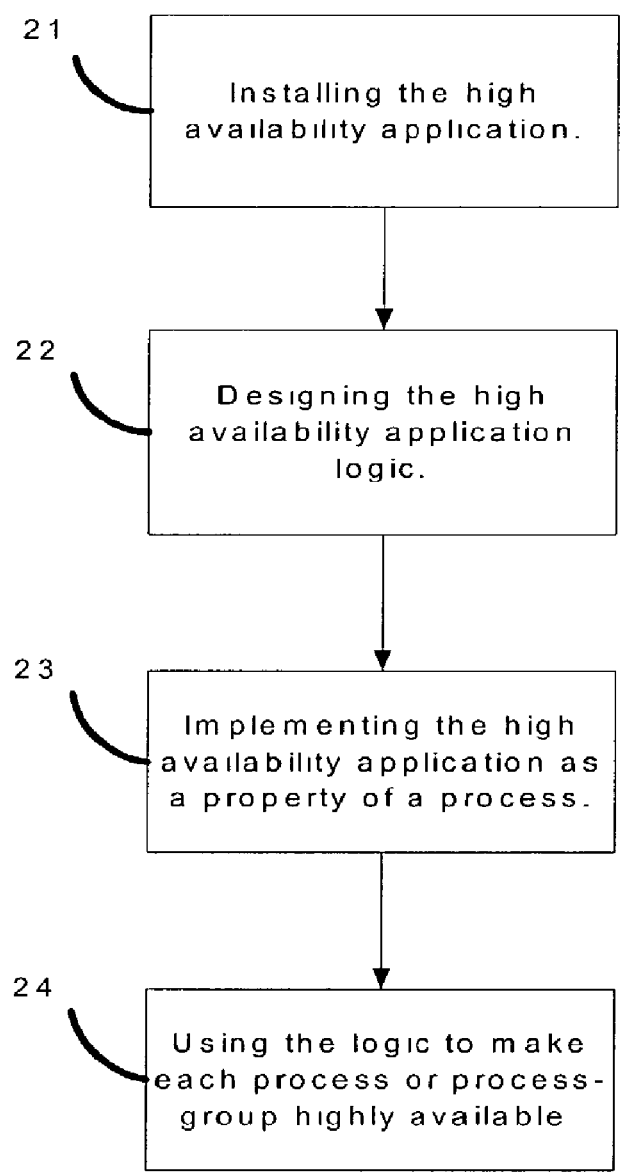
FIG. 2 is a flow chart illustrating one embodiment of a method for providing a high availability application at low cost for a wide range of solution architectures for the system in FIG. 1, in accordance with the present invention.

Referring now to FIG. 1 and FIG. 2, one embodiment of a method for providing a high availability application at low cost for a wide range of solution architectures is generally shown at numeral 20. A specific embodiment of the present invention is HA-lite (HAL).

In one embodiment, twinituner, a simplistic web-based wizard, may be run to install HAL, (Block 21). HAL can be installed on any system running the UNIX operating system or any of its variants. For example, HAL may be installed on servers 17 and 18 of system 10.

Once HAL is installed, it must be configured. The HAL logic may be designed for each process or process-group on which HAL is implemented using the finite state table, (Block 22). A process-group is comprised of processes having common HAL property values, such as user-designated values 'other' and 'port.' All processes in a process-group will be controlled by a single HAL application.

Designing the HAL logic includes editing the finite state table. Designing the HAL logic can also include simulating the configuration changes to the finite state table on a server where HAL is installed and then evaluating the configuration changes to the finite state table. Twinituner can also be used to monitor deployed twinit processes and their associated HAL operations.

Once HAL is installed and configured, twinit may be used to implement HAL as a property of one or more of the processes running on servers 17 and 18, (Block 23). Twinit enables HAL to become part of the settings of the process.

After being installed, configured, and then associated with a process or process-group, HAL then is able to use the logic from the finite state table for each process or process-group to make each process or process-group highly available for system 10, (Block 24). For example, one instance of an email application, A, may be installed on server 17 and another instance of the same email application, B, may be installed on server 18. HAL may be installed as a property of applications A and B in order to make highly available the email application to clients 11, 12, and 13.

Referring now to FIG. 3, a chart representation of one embodiment of a design for a finite state table for the system of FIG. 1, is shown generally at 30. In one example, chart 30 may represent a finite state table of a HAL application utilized to minimize outages of system 10. This configuration will ensure that the needed application, for example an email application, is running on at least one of the servers 17 or 18. With this configuration, there may be times when the email application is running on both server 17 and server 18 at the same time. Another embodiment may be configured to ensure that there are never times when more than one active email application is running at a time.

Finite state table 30 incorporates two servers, a first server 31 referred to as the 'this' server and a second server 32 referred to as the 'other' server. 'This' server 31 may be in one of eight states. First, it may be in a primary role (P), able to ping a reference server (Ping Ref or PR), and healthy (H). Second, it may be in a primary role, able to ping a reference server, but unhealthy (!H). Third, it may be in a primary role, unable to ping a reference server (!PR), but healthy. Fourth, it may be in a primary role, unable to ping a reference server, and unhealthy. Fifth, it may be in a secondary role (S), able to ping a reference server, and healthy. Sixth, it may be in a secondary role, able to ping a reference server, but unhealthy. Seventh, it may be in a secondary role, unable to ping a reference server, but healthy. Eighth, it may be in a secondary role, unable to ping a reference server, and unhealthy.

'Other' server 32 may also be in one of the eight states listed, or it may be in an unknown state (?). The finite state table is configured to control what state 'this' server 31 will remain in or become in relation to the state of 'other' server 32. In our example, 'this' server 31 may be server 17 and 'other' server 32 may be server 18. Both servers 17 and 18 may be running the same email application for use by clients 11, 12, and 13.

'This' server will maintain communication with 'other' server 32 to check the status of the 'other' server 32. Knowledge of the status of 'other' server 32, along with configurations in the finite state table, allow HAL to control the role of 'this' server 31, and to ensure the high availability of the email application for clients 11, 12, and 13. The implementation of this communication can be achieved in any of several ways well known in the art. For example, the communication may be achieved using broadcasts, RPC handshaking, bespoke socket client-server software, and the like.

Many test conditions are used by the finite state table to help define the status of 'this' server 31 and 'other' server 32. One test condition used by the finite state table is 'pinging a reference server.' By pinging a reference server, located within system 30, different types of system failures on 'this' server 31 and 'other' server 32 may be differentiated. By adding either 'able to ping a reference server' (PR) or 'unable to ping a reference server' (!PR), a better informed guess can be made as to the cause of the system failure and therefore a better decision can be made as to which role 'this' server 31 should adopt.

An additional test condition used by the finite state table is health. Health may represent some user-specified set of tests that return a Boolean, 'healthy' (H) or 'not healthy' (!H). An example may be a check to see that certain processes are running, or that operating system capacities are not exceeded (e.g. disk partitions are not full and that paging space is not critically low). To facilitate dependence, 'this' server 31 may be able to check the health of 'other' server 32.

In one example of a finite state table design illustrated in chart 30, 'this' server 31 is primary (P), unable to ping a reference server (!PR), and unhealthy (!H). By communicating with 'other' server 32, 'this' server 31 obtains knowledge of 'other' server's state, which is secondary (S), able to ping a reference server (PR), and healthy (H). Configured to minimize outages, the finite state table will direct 'this' server 31 to become secondary, but 'this' server will wait to yield from primary to secondary until 'other' server 32 has taken over as primary (deferred-yield or DY), shown at 33.

In another example of the finite state table design illustrated in chart 30, 'this' server 31 is secondary (S), able to ping a reference server (PR), and healthy (H). By communicating with 'other' server 32, 'this' server 31 obtains knowledge of 'other' server's state, which is primary (P), able to ping a reference server (PR), and healthy (H). Configured to minimize outages, the finite state table will direct 'this' server 31 to become secondary (S), shown at 34.

Other examples of roles used by the finite state table include deferred-takeover (DT), which is the tactic of deferring change from secondary to primary until 'other' server has yielded from primary to secondary. Another role is '?ip<,' where 'this' server will check the IP address of 'other' server, and if 'this' server's IP address is less than the IP address of 'other' server, 'this' server will become or remain secondary, else it will become primary. Yet another role is '?ip>,' where 'this' server will check the IP address of 'other' server, and if 'this' server's IP address is greater than the IP address of 'other' server, 'this' server will become or remain primary, else it will become or remain secondary. Lastly, another role is 'Stay Primary if Communications Error' (SPICE), where 'this' server will remain primary when the role of 'other' server is unknown and 'this' server is not able to ping the reference server.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of providing a high availability application using a network-based system including a plurality of clients and a plurality of servers, the method further comprising:
   pinging at least one of the plurality of servers;
   determining a finite state table based on a status of the plurality of servers, the finite state table defining status of at least one of the plurality of servers, wherein the finite state table is a pluggable logic model that directs system roles;
   selecting at least one server based on the finite state table to form a selected at least one server, wherein the at least one server is a first server;
   providing the high availability application from the selected at least one server to at least one of the plurality of clients, wherein providing the high availability application includes minimizing system outages;
   setting the first server to operate as a secondary server in response to determining that a second server internet protocol (IP) address is equal to or greater than an IP address of the first server; and
   setting the first server to operate as a primary server in response to determining that the second server IP address is less than the IP address of the first server.

2. The method of claim 1 further comprising:
   determining at least one server to operate as a primary server and at least one server to operate as a secondary server.

3. The method of claim 1 wherein the finite state table incorporates at least two servers, and wherein the at least two servers maintain communication by broadcast with each other to check the status of a disk partition being full of each of the at least two servers.

4. The method of claim 1 further comprising:
   simulating configuration changes of the finite state table; and
   evaluating configuration changes of the finite state table.

5. A computer usable medium storing a program containing computer readable code for providing a high availability application using a network-based system including a plurality of clients and a plurality of servers, the computer usable medium further comprising:
   computer readable code for pinging at least one of the plurality of servers;
   computer readable code for determining a finite state table based on a status of the plurality of servers, the finite state table defining status of at least one of the plurality of servers, wherein the finite state table is a pluggable logic model that directs system roles;
   computer readable code for selecting at least one server based on the finite state table to form a selected at least one server, wherein the at least one server is a first server;
   computer readable code for providing the high availability application from the selected at least one server to at least one of the plurality of clients, wherein providing the high availability application includes minimizing system outages;
   computer readable code for setting the first server to operate as a secondary server in response to determining that a second server internet protocol (IP) address is equal to or greater than an IP address of the first server; and
   computer readable code for setting the first server to operate as a primary server in response to determining that the second server IP address is less than the IP address of the first server.

6. The computer usable medium of claim 5 further comprising:
computer readable code for determining at least one server to operate as a primary server and at least one server to operate as a secondary server.

7. The computer usable medium of claim 5 wherein the finite state table incorporates at least two servers, and wherein the at least two servers maintain communication by broadcast with each other to check the status of a disk partition being full of each of the at least two servers.

8. The computer usable medium of claim 5 further comprising:
computer readable code for simulating configuration changes of the finite state table; and
computer readable code for evaluating configuration changes of the finite state table.

9. A system for providing a high availability application using a network-based system including a plurality of clients and a plurality of servers comprising:
means for pinging at least one of the plurality of servers;
means for determining a finite state table based on a status of the plurality of servers, the finite state table defining status of at least one of the plurality of servers, wherein the finite state table is a pluggable logic model that directs system roles;
means for selecting at least one server based on the finite state table to form a selected at least one server, wherein the at least one server is a first server;
means for providing the high availability application from the selected at least one server to at least one of the plurality of clients, wherein providing the high availability application includes minimizing system outages;
means for setting the first server to operate as a secondary server in response to determining that a second server internet protocol (IP) address is equal to or greater than an IP address of the first server; and
means for setting the first server to operate as a primary server in response to determining that the second server IP address is less than the IP address of the first server.

10. The system of claim 9 further comprising:
means for determining at least one server to operate as a primary server and at least one server to operate as a secondary server.

11. The system of claim 9 wherein the finite state table incorporates at least two servers, and wherein the at least two servers maintain communication by broadcast with each other to check the status of a disk partition being full of each of the at least two servers.

12. The system of claim 9 further comprising:
means for simulating configuration changes of the finite state table; and
means for evaluating configuration changes of the finite state table.

* * * * *